United States Patent
Kolchin et al.

(10) Patent No.: US 10,585,286 B2
(45) Date of Patent: Mar. 10, 2020

(54) SYSTEM AND METHOD FOR DISPLAYING REAL OR VIRTUAL SCENE

(71) Applicant: Samsung Electronics Co., Ltd., Suwon-si, Gyeonggi-do (KR)

(72) Inventors: Konstantin Viktorovich Kolchin, Moscow (RU); Gleb Sergeevich Milyukov, Moscow (RU); Sergey Alexandrovich Turko, Moscow (RU); Jae-yeol Ryu, Moscow (RU); Mikhail Vyacheslavovich Popov, Moscow Region (RU); Stanislav Aleksandrovich Shtykov, Moscow (RU); Andrey Yurievich Shcherbinin, Moscow (RU); Chan-yul Kim, Seongnam-si (KR); Myung-ho Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 21 days.

(21) Appl. No.: 16/059,668

(22) Filed: Aug. 9, 2018

(65) Prior Publication Data
US 2019/0056594 A1 Feb. 21, 2019

(30) Foreign Application Priority Data

Aug. 15, 2017 (RU) .................................. 2017129073
Jul. 3, 2018 (KR) ........................ 10-2018-0077317

(51) Int. Cl.
*G02B 27/01* (2006.01)
*G09G 3/34* (2006.01)
(Continued)

(52) U.S. Cl.
CPC ......... *G02B 27/0172* (2013.01); *G09G 3/001* (2013.01); *G09G 3/003* (2013.01);
(Continued)

(58) Field of Classification Search
CPC .................................................. G02B 27/0172
(Continued)

(56) References Cited

U.S. PATENT DOCUMENTS 8,570,634 B2 10/2013 Luebke et al.
9,146,403 B2 9/2015 Lanman et al.
(Continued)

FOREIGN PATENT DOCUMENTS

JP 2015-504616 A 2/2015
KR 10-2015-0105941 A 9/2015
(Continued)

OTHER PUBLICATIONS

Huang, K. Chen, G. Wetzstein. "The Light-Field Stereoscope: Immersive Computer Graphics via Factored Near-Eye Light Field Displays with Focus Cues", ACM SIGGRAPH (Transactions on Graphics 33, 5), 2015.
(Continued)

*Primary Examiner* — Javid A Amini
(74) *Attorney, Agent, or Firm* — Jefferson IP Law, LLP

(57) ABSTRACT

A system and a method for displaying a scene are provided. The system includes a display configured to emit light, a spatial light modulator configured to modulate input light based on a transparency value, and at least one processor configured to acquire adjustment information including transparency of the spatial light modulator and light intensity information of the display from a plurality of pieces of view information corresponding to the scene and adjust an intensity value of the light emitted from the display and the transparency value of the spatial light modulator based on the adjustment information, wherein the plurality of pieces of view information are optical information of the scene, the optical information having been acquired at a plurality of viewpoints.

19 Claims, 10 Drawing Sheets

(51) Int. Cl.
*G09G 3/36* (2006.01)
*G09G 3/00* (2006.01)

(52) U.S. Cl.
CPC .............. *G09G 3/3426* (2013.01); *G09G 3/36* (2013.01); *G02B 27/0176* (2013.01); *G09G 2300/023* (2013.01); *G09G 2320/0626* (2013.01)

(58) Field of Classification Search
USPC .......................................................... 345/633
See application file for complete search history.

(56) References Cited

U.S. PATENT DOCUMENTS

| | | | |
|---|---|---|---|
| 9,658,456 | B2 | 5/2017 | Mukawa |
| 9,778,469 | B2 | 10/2017 | Kimura et al. |
| 2012/0212400 | A1 | 8/2012 | Border et al. |
| 2014/0063077 | A1 | 3/2014 | Wetzstein et al. |
| 2014/0168783 | A1 | 6/2014 | Luebke et al. |
| 2015/0310789 | A1 | 10/2015 | Heide et al. |
| 2016/0062125 | A1 | 3/2016 | Baek et al. |
| 2016/0062454 | A1 | 3/2016 | Wang et al. |
| 2016/0209658 | A1 | 7/2016 | Zalewski |
| 2019/0025587 | A1 | 1/2019 | Osterhout et al. |

FOREIGN PATENT DOCUMENTS

| | | |
|---|---|---|
| RU | 2 632 257 C2 | 10/2017 |
| WO | 2014/155288 A2 | 10/2014 |

OTHER PUBLICATIONS

Russian Office Action dated Apr. 4, 2018, issued in the Russian Patent Application No. 2017129073.
Russian Notice of Allowance dated Jul. 24, 2018, issued in the Russian Patent Application No. 2017129073.
International Search Report dated Jan. 4, 2019, issued in the International Patent Application No. PCT/KR2018/009072.
Russian Search Report dated Apr. 3, 2018, issued in the Russian Patent Application No. 2017129073.

SYSTEM AND METHOD FOR DISPLAYING REAL OR VIRTUAL SCENE

CROSS-REFERENCE TO RELATED APPLICATION(S)

This application is based on and claims priority under 35 U.S.C. § 119(a) of a Russian patent application number 2017129073, filed on Aug. 15, 2017, in the Russian Intellectual Patent Office, and of a Korean patent application number 10-2018-0077317, filed on Jul. 3, 2018, in the Korean Intellectual Property Office, the disclosure of each of which is incorporated by reference herein in its entirety.

BACKGROUND

1. Field

The disclosure relates to an imaging technology. More particularly, the disclosure relates to a system and a method for displaying a real or virtual scene capable of generating high image quality three-dimensional (3D) images while addressing a vergence-accommodation conflict.

The disclosure enables a user to be immersed in a virtual reality (VR) of various tasks, such as 3D modeling, navigation, design, and entertainment. The disclosure may be employed in various head-mounted devices (HMDs), such as VR glasses or helmets, which are being increasingly used in game and education industries at the moment.

2. Description of Related Art

This section is not provided to describe the technical features of the disclosure, and thus the technical features of the disclosure are not limited by this section. This section is to provide the outline of the related art, which belongs to the same technical field as the disclosure, to those of ordinary skill in the art and to thereby make clear the technical importance due to differences between the related art and the disclosure.

Recently, VR technology has been increasingly used in various fields of life within human society (traditional and well-known applications in game and education industries). To popularize the VR technology and provide for its long-term application, it is necessary to provide a visually comfortable interaction between users and reality.

Modern VR displays support various cues of human vision, for example, motion parallax, binocular disparity, binocular occlusion, and vergence. However, an accommodation cues of a human eye for virtual objects is not supported by these displays. This causes a phenomenon called vergence-accommodation conflict to occur. The vergence-accommodation conflict occurs because a human vision system needs to maintain a certain focal distance of eyeball lenses when viewing a 3D image, in order to focus on an image formed and viewed by a display or a lens, while simultaneously a user has to change focal distances of the eyeball lenses based on distances to a virtual object according to the current movement of his or her eyes. In other words, the vergence-accommodation conflict occurs since virtual objects are viewed as if the virtual objects were located at different "distances", but the virtual objects actually exist on a flat surface of a display screen abreast of each other. This conflict between a virtual sequence and reality causes visual discomfort, eye fatigue, eye tension, and headache.

At the moment, light field display technology aiming at addressing the issues of negative effects by delivering the same light as normally received by eyes to the eyes under similar conditions to those of a real life has been being developed.

An embodiment of such a display is disclosed in US 2014/0063077. In more detail, this document discloses a display apparatus including one or more light attenuation layers of which addresses are spatially assignable, and a controller configured to perform computations needed to control the display apparatus, and to address an optimization issue by using weighted nonnegative tensor factorization (NTF) for memory-efficient representation of a light field at a low density. This NTF requires high costs. Furthermore, known apparatuses have no mobility and cannot be head-mounted.

An embodiment of the disclosure is disclosed in paper "The Light-Field Stereoscope: Immersive Computer Graphics via Factored Near-Eye Light Field Displays with Focus Cues (ACM SIGGRAPH, Transactions on Graphics 33, 5, 2015)" by F. Huang, K. Chen, and G. Wetzstein. This paper discloses a portable VR display supporting an initial high resolution image and the possibility of focusing a user's eyes on a virtual object, that is, the possibility of addressing the vergence-accommodation conflict. A light field appears on each eye, and a more natural visual experience than that in existing near-eye displays is provided through the light field. The proposed display uses rank-1 light field factorization. To implement the display described above, an expensive time-division multi-image display or eye tracking unit is not required. However, the authors of the paper used computationally complicated non-negative matrix factorization (NMF) for a solution.

Therefore, a need exists for a display system, e.g., a head-mountable display suitable for a VR application, capable of addressing the vergence-accommodation conflict while generating a high-quality image.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for displaying a real or virtual scene without requiring complex computation while addressing a vergence-accommodation conflict.

Additional aspects will be set forth in part in the description which follows and, in part, will be apparent from the description, or may be learned by practice of the presented embodiments.

In accordance with an aspect of the disclosure, a system for displaying an image in a unit of a scene is provided. The system includes a display configured to emit light, a spatial light modulator configured to modulate input light based on a transparency value, and at least one processor configured to acquire adjustment information including transparency of the spatial light modulator and light intensity of the display from a plurality of pieces of view information corresponding to the scene and adjust an intensity value of the light emitted from the display and the transparency value of the spatial light modulator based on the adjustment information, wherein the plurality of pieces of view information are optical information of the scene, which has been acquired at a plurality of viewpoints.

In accordance with another aspect of the disclosure, a scene display method of displaying an image in a unit of a scene is provided. The method includes receiving a plurality of pieces of view information corresponding to the scene, acquiring, from the plurality of pieces of view information, adjustment information including light intensity of light emitted from a display and transparency of a spatial light modulator configured to modulate the light, and adjusting an intensity value of the light emitted from the display and a transparency value of the spatial light modulator, based on the adjustment information, wherein the plurality of pieces of view information are optical information of the scene, which has been acquired at a plurality of viewpoints.

In accordance with another aspect of the disclosure, at least one non-transitory computer-readable recording medium has recorded thereon a computer-readable program for performing the method described above.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
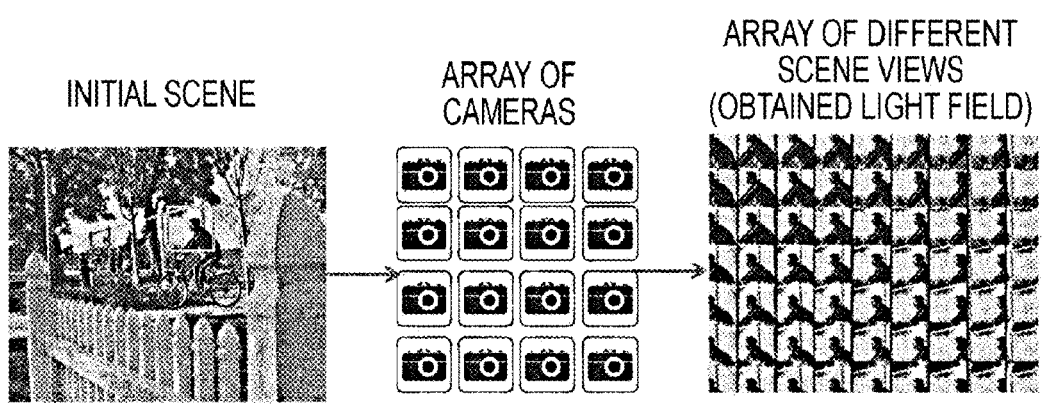
FIG. 1 illustrates a light field diagram according to a view array of a specific scene captured at different viewpoints by using a camera array according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The term "various embodiments" used in the specification indicates that the term is used "illustratively or for description". It is not analyzed that an embodiment disclosed as "various embodiments" in the specification is necessarily more preferred than the other embodiments.

Reference will now be made to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items.

FIG. 1 illustrates a light field diagram according to a view array of a specific scene captured at different viewpoints by using a camera array according to an embodiment of the disclosure.

Referring to FIG. 1, in the specification, "light field" indicates a vector function indicating an amount of light moving in an arbitrary direction passing through an arbitrary point in a space. For example, "light field" indicates a spatial distribution of light fluxes coming out from a visualized image or scene. "Light field" is specified by a conversion direction and a specific value of radiant energy at each point. A light field of a specific (real or virtual) scene may be approximated by an array of a plurality of different views for a corresponding scene. The views may be respectively obtained from different viewpoints by using, for example, an array of cameras or micro lenses of a plenoptic camera. Therefore, as shown in FIG. 1, views may be slightly shifted with respect to each other.

Figure 2:
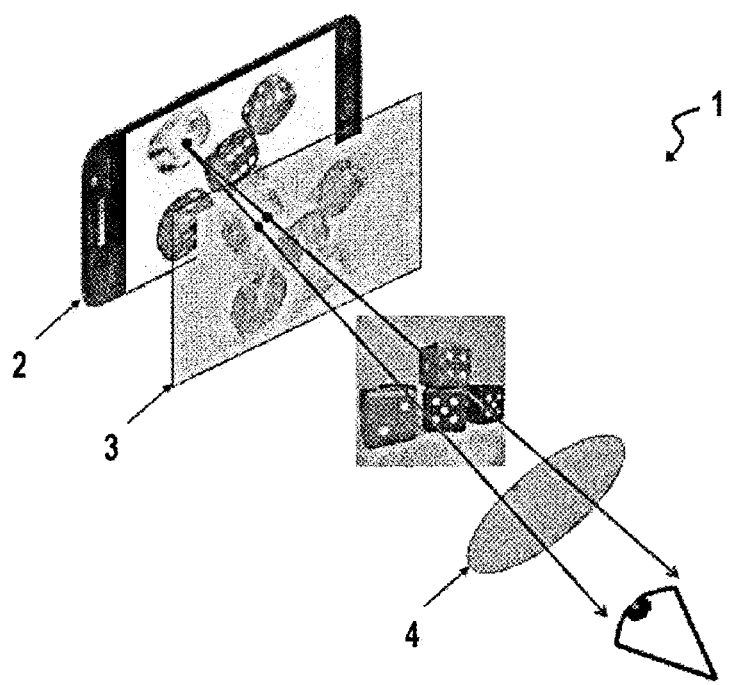
FIG. 2 illustrates an extended view of a display system for displaying a real or virtual scene according to an embodiment of the disclosure.

FIG. 2 illustrates an extended view of a display system for displaying a real or virtual scene according to an embodiment of the disclosure.

Referring to FIG. 2, a display system 1 may include a mobile electronic device 2, a spatial light modulator 3, and an optical lens 4.

The embodiment shows a case where the mobile electronic device 2 is a mobile or cellular phone, but those of ordinary skill in the art may replace the mobile or cellular phone by using devices capable of implementing the same functions, such as a laptop computer, a tablet computer, and a portable digital player. In addition, a dice image shown as an initial scene in FIG. 2 is not to limit the embodiment of the disclosure, and the technical idea of the embodiment may be applied in the same way to more complex images including objects and subjects in various types and forms. According to an embodiment of the disclosure, a display of the mobile electronic device 2 may be an organic light emitting diode (OLED) display or a display having a different pixel structure.

The spatial light modulator 3 is disposed at the front of the display of the mobile electronic device 2 and may have a pixel structure having a controllable color slide. The spatial light modulator 3 will be described below.

Figure 3A:
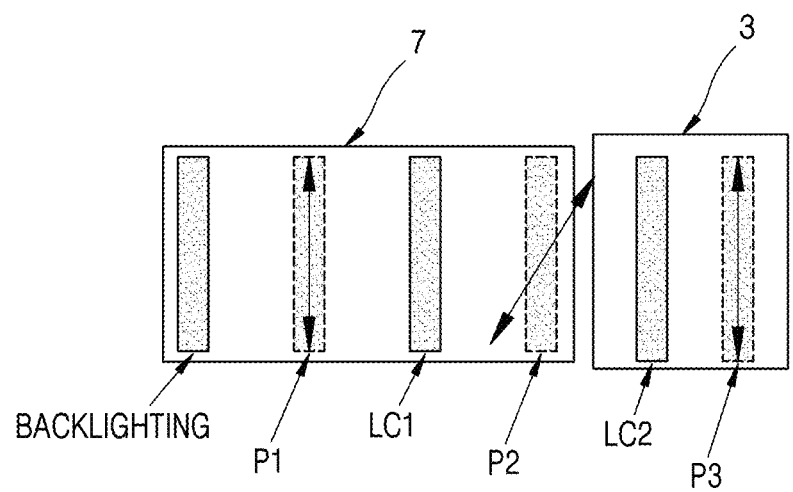
FIGS. 3A and 3B illustrate spatial light modulators according to display types of a mobile electronic device according to various embodiments of the disclosure.
Figure 3B:
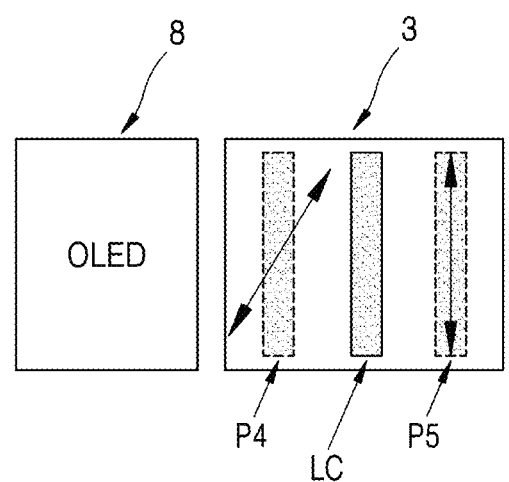

FIGS. 3A and 3B illustrate spatial light modulators according to display types of a mobile electronic device according to various embodiments of the disclosure.

Referring to FIG. 3A, a liquid crystal display 7 is used as the display of the mobile electronic device 2, and as described in the document (Mukhin, I. A., Development of liquid-crystal monitors, BROADCASTING Television and radiobroadcasting: 1 part—No. 2(46), March 2005, pp. 55-56; 2 part—No. 4(48), June-July 2005, pp. 71-73), the liquid crystal display 7 may include a backlighting unit, one pair of a first polarizing plate P1 and a second polarizing plate P2, and a first liquid crystal layer LC1 located between the first polarizing plate P1 and the second polarizing plate P2. Herein, a second crystal layer LC2 and a third polarizing plate P3 located in the proximity of a user are used as the spatial light modulator 3. Accordingly, compared with a method of using the first polarizing plate P1 located between the display and the first liquid crystal layer LC1, the first liquid crystal layer LC1, and the second polarizing plate P2 next to the first liquid crystal layer LC1 as a spatial light modulator, in a method of using the second crystal layer LC2 and the third polarizing plate P3 as the spatial light modulator 3, the number of polarizing plates used for a spatial light modulator may be reduced, and thus a size of the display system 1 (not shown in FIG. 3A) may be reduced.

Referring to FIG. 3B, an OLED display 8 may be used as the display of the mobile electronic device 2. As described with reference to FIG. 3A, a fourth polarizing plate P4, a liquid crystal layer LC, and a fifth polarizing plate P5 may be used as the spatial light modulator 3.

As described with reference to FIG. 2, the optical lens 4 is located at the rear of the spatial light modulator 3 at a viewpoint of the user of the display system 1 and is also located at the front of one eye of the user. Optical lenses having the same form as the optical lens 4 may be arranged at the front of the other eye of the user. A set of these lenses constitutes an optical lens device.

A transparency value of pixels of the spatial light modulator 3 and an intensity value of pixels of the display of the mobile electronic device 2 may be variably changed by control signals provided from at least one processor or controller (not shown) included in the display system 1. An adjustment operation for the transparency and intensity will be described when a method of operating the display system 1 is described.

Figure 4:
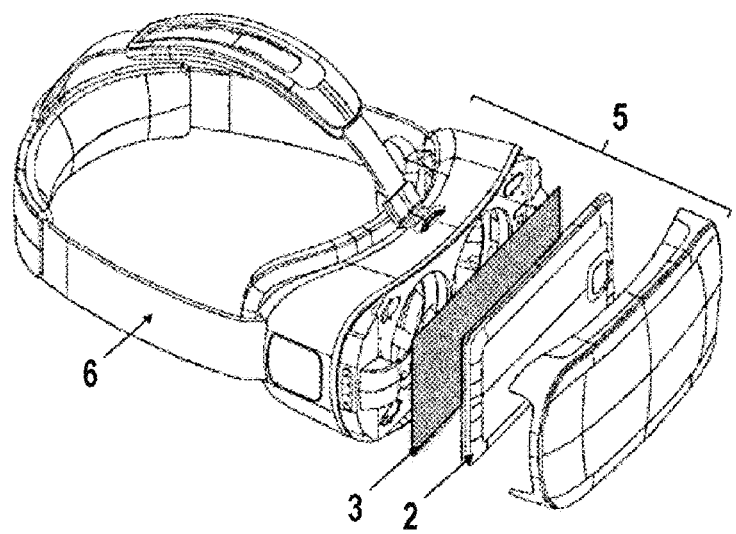
FIG. 4 illustrates a display system including a belt for mounting to a head according to an embodiment of the disclosure.

FIG. 4 illustrates a display system including a belt for mounting to a head according to an embodiment of the disclosure.

Referring to FIG. 4, the above-described components of the display system 1, particularly, the mobile electronic device 2 and the spatial light modulator 3 shown together in FIG. 2, may be accommodated in a case or enclosure 5 (see FIG. 4) made of a proper material, such as plastic or a synthetic material. In addition, to provide the possibility of mounting the display system 1 to the head of the user, for example, a specific mounting unit disposed on a leather belt 6 (see FIG. 4) connected to the case or enclosure 5 may be used. According to an embodiment of the disclosure, the case or enclosure 5 may be virtual reality (VR) glasses or a VR helmet.

Figure 5:
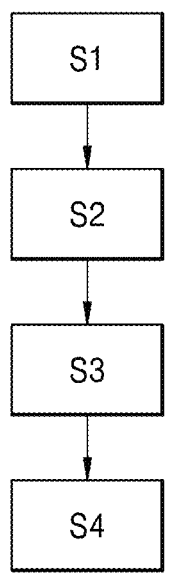
FIG. 5 is a flowchart of a method of operating a display system according to an embodiment of the disclosure.

FIG. 5 is a flowchart of a method of operating a display system according to an embodiment of the disclosure.

Referring to FIG. 5, an operation of the display system 1 will be described below. Particularly, operations performed by the processor or controller described above will be described with reference to FIG. 5.

In operation S1, the processor or controller receives a set of views of a real or virtual scene, for example, dice shown in FIG. 2. Each view of the real or virtual scene is specified by a field of view defined for a scene, as described with reference to FIG. 1. A set of views of a scene may be acquired by using a plenoptic camera, for example, Lytro Illum. The set of the acquired views may be stored in a memory of the mobile electronic device 2. In this case, the processor or controller may access the memory of the mobile electronic device 2 to extract a set of views of a scene for subsequent processing.

According to an embodiment of the disclosure, the processor or controller may form a set of views of a scene by itself by using a rendering program.

In operation S1, the processor or controller may generate a matrix of the views by using geometric parameters of a system (for example, a distance between a display of a mobile electronic device and a spatial light modulator, a focal distance of a lens, and distances from the lens to the display and the modulator in each view).

Figure 6:
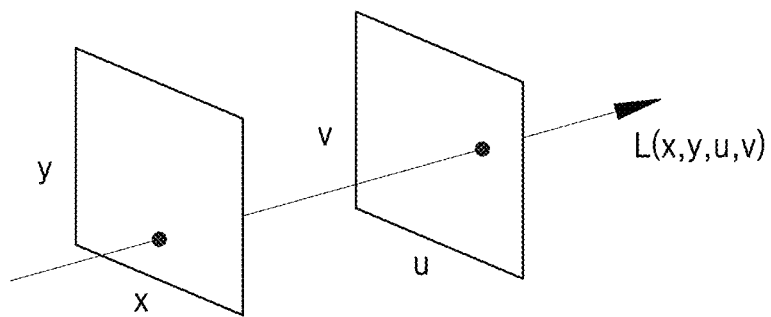
FIG. 6 illustrates a two-parameter light field expression by Levoy and Hanrahan according to an embodiment of the disclosure.

FIG. 6 illustrates a two-parameter light field expression by Levoy and Hanrahan according to an embodiment of the disclosure.

Referring to FIG. 6, when the matrix of the views is generated, the processor or controller may be based on a two-parameter light field expression by Levoy and Hanrahan. FIG. 6 shows an xy plane and a uv plane of a light field. Referring to FIG. 6, the light field may be represented by a four-dimensional (4D) function $L(x, y, u, v)$ indicating the intensity of light in an optical space, which is incident to one arbitrary dot on the xy plane after passing through one arbitrary dot on the uv plane under the expression described above.

Figure 7:
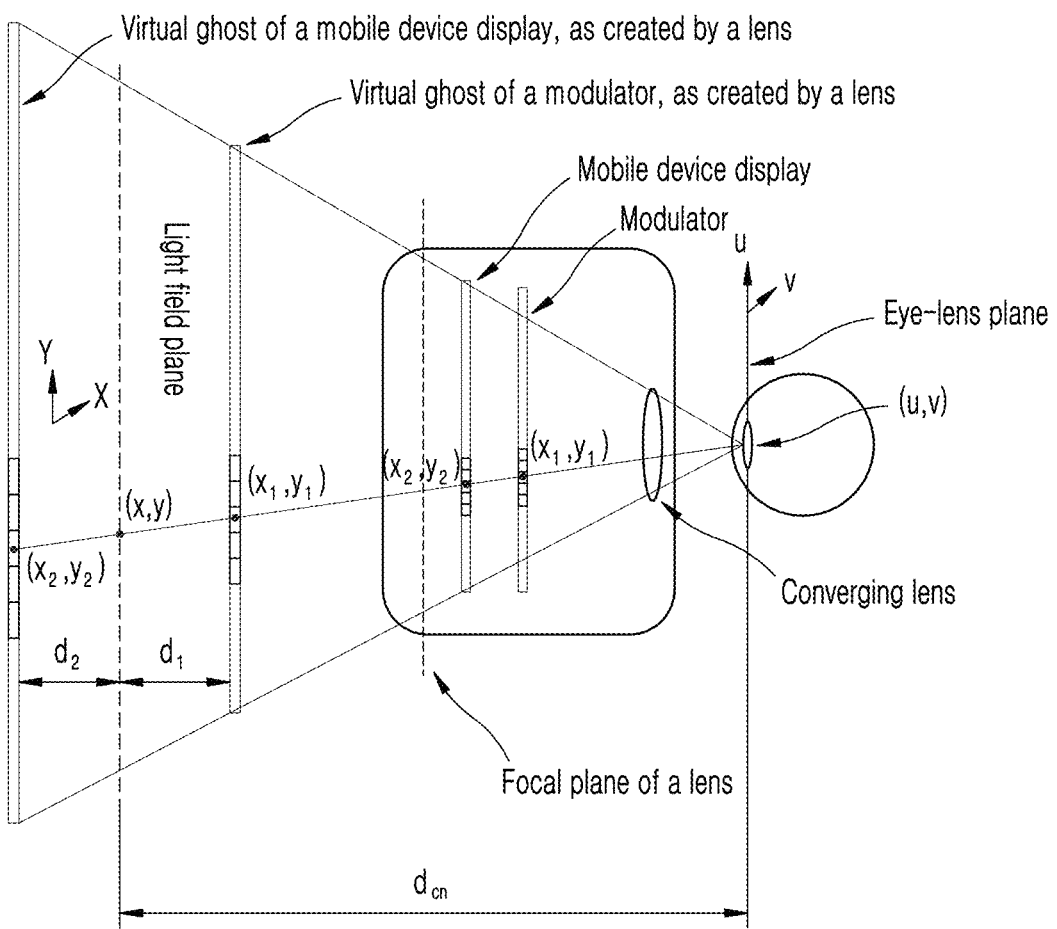
FIG. 7 illustrates a weighted-matrix calculation method performed based on geometric parameters of a system according to an embodiment of the disclosure.

FIG. 7 illustrates a weighted-matrix calculation method based on geometric parameters of a system according to an embodiment of the disclosure.

Referring to FIG. 7, according to a simple geometric consideration with reference to FIG. 7, integer coordinates of points at which light crosses images on a display and a modulator, the integer coordinates being derived from an angle of the display or the modulator, are shown, and virtual ghosts of the display and the modulator are calculated as below.

$$x_k = \left\lfloor \frac{1}{M_k p_k}\left(\frac{W}{2} + x \pm \frac{d_k}{d_{cn}}(u - x)\right)\right\rfloor \quad \text{Equation 1}$$

$$y_k = \left\lfloor \frac{1}{M_k p_k}\left(\frac{H}{2} + y \pm \frac{d_k}{d_{cn}}(v - y)\right)\right\rfloor \quad \text{Equation 2}$$

According to an embodiment of the disclosure, in Equations 1 and 2, k denotes 1 or 2, wherein 1 and 2 correspond to the modulator and the display, respectively. The signs + and − included in ± of Equations 1 and 2 correspond to the modulator and the display, respectively, and $M_1$ and $M_2$ denote magnification constants of the virtual ghosts of the modulator and the display, respectively. In addition, $p_1$ and $p_2$ denote pixel sizes of the modulator and the display, respectively, W and H denote a height and a length of a physical view image on the xy plane of the light field ($d_k$ denoting a relative location or distance between the xy plane of the light field and a virtual ghost is selected to acquire best image quality), and $d_{cn}$ denotes a distance from an eye-lens plane to a light field plane.

In a light field factorization operation, the light field L(x, y, u, v) is factorized to a multiplication of transparency $t(x_1, y_1)$ of the spatial light modulator and light intensity $l(x_2, y_2)$ of the display.

$$L(x,y,u,v) \approx t(x_1,y_1)l(x_2,y_2) \quad \text{Equation 3}$$

As described with respect to Equations described above, $x_1$, $x_2$, $y_1$, and $y_2$ may be represented as x, y, u, and v through Equation 1 and Equation 2.

However, this kind of tensor factorization is complex, and thus there exists high calculation burden. Therefore, the disclosure illustrates an embodiment of reducing this high calculation burden by using a simpler matrix factorization method than a tensor factorization method. For matrix factorization, t and l denoting transparency and intensity may be factorized to vectors a and b as follows.

$$a_i = t(x_1, y_1), \quad \text{Equation 4}$$

$$b_j = l(x_2, y_2), \quad \text{Equation 5}$$

$$i = y_1 w_1 + x_1, \quad \text{Equation 6}$$

$$j = y_2 w_2 + x_2, \quad \text{Equation 7}$$

Herein, $w_k$ denotes a width of images of the modulator or the display corresponding to a value of k and is measured based on the number of pixels measured along an x axis.

A value of the light field L(x, y, u, v) is "encapsulated" to an element $T_{ij}$ of a matrix of views, and thus Equation may be replaced by Equation 8.

$$T_{ij} \approx a_i b_j \quad \text{Equation 8}$$

In operation S3, the processor or controller generates an adjustment matrix indicating a product of a column vector indicating a transparency value of pixels of the spatial light modulator and a row vector indicating a brightness value of pixels of the display of the mobile electronic device. Herein, elements of the column vector and the row vector are selected such that the adjustment matrix is approximately the same as the matrix of the views.

In more detail, an element (I, j) of the adjustment matrix is obtained when light passes through a jth pixel of the display and an ith pixel of the spatial light modulator. When it is assumed that the matrix of the views is T, and the transparency and the intensity described above are a and b, the fact that the matrix of the views is "approximately the same" as the adjustment matrix indicates that $T \approx ab^T$.

This optimization operation may be addressed by various methods. According to an embodiment of the disclosure, the optimization operation may be performed by using weighted rank-1 residue iteration (WRRI). A detailed operation of the WRRI is described in the related art (for example, HO, N.-D., Nonnegative Matrix Factorization Algorithms and Applications, PhD thesis, Universit'e catholique de Louvain, 2008; and HEIDE et al., Cascaded displays: spatiotemporal superresolution using offset pixel layers, ACM Transactions on Graphics (TOG)—Proceedings of ACM SIGGRAPH 2014, Volume 33, Issue 4, July 2014).

The number of views is limited, and thus minimization is required through limitation of the number of elements to be used for a computation. Accordingly, a weighted matrix W determined such that $T \approx Wab^T$ is provided. Herein, the weighted matrix W includes only a weighted constant for a part where views of a scene are "encapsulated" and has a value of zero for the remaining parts. The optimization operation continues until elements of the vectors a and b causing the adjustment matrix to be most approximate with the matrix of the views are found out. Equation 9 is an embodiment of the optimization operation.

$$\operatorname*{argmin}_{a_i \geq 0, b_j \geq 0} \frac{1}{2}\|W \circ (T - ab^T)\|_2^2 \quad \text{Equation 9}$$

In Equation 9, symbol $\|\ \|_2$ denotes $L_2$-norm satisfying $$\|A\|_2^2 = \sum_{ij} A_{ij}^2,$$

and an operation symbol ° denotes a product between elements, for example, an Hadamard product, performed for element of the vectors a and b until the adjustment matrix is approximately the same as the matrix of the views.

The centers of the pixels of the display included in the mobile electronic device 2 and the spatial light modulator 3 are matched with each other, number "1" is assigned to elements of the matrix W corresponding to corresponding views (for example, i and j where Tij is encapsulated from the views), and the remaining elements of the matrix are filled with zero. If this matching does not occur, the matrices T and W are constructed using barycentric coordinates, and distortion of the views of the scene in a subsequent processing operation is prevented through the construction using barycentric coordinates.

Figure 8:
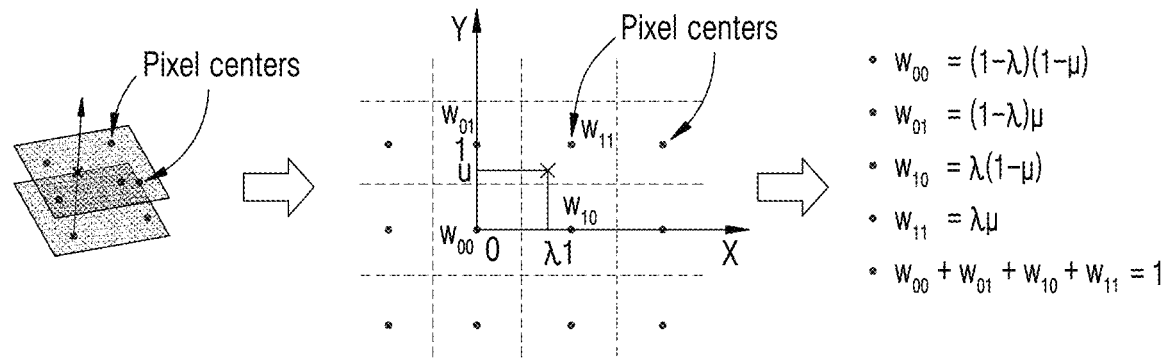
FIG. 8 illustrates a matrix consisting of views using a barycentric coordinate system according to an embodiment of the disclosure.

FIG. 8 illustrates a matrix consisting of views using a barycentric coordinate system according to an embodiment of the disclosure.

Referring to FIG. 8, a construction operation using barycentric coordinates is described. Referring to FIG. 8, λ and μ denote coordinates (pixel centers) of a point marked in an X shape on the plane of the spatial light modulator 3, and $w_{00}$, $w_{01}$, $w_{10}$, and $w_{11}$ are values allocated to four elements specified by coordinates $(x_k, y_k)$, $(x_k+1, y_k)$, $(x_k, y_k+1)$, and, $(x_k+1, y_k+1)$. A sum of $w_{00}$, $w_{01}$, $w_{10}$, and $w_{11}$ is 1, and thus a unit weight is allocated to four neighboring elements. To construct the matrix of the views, each pixel value in each of four elements may be iterated four times.

According to an embodiment of the disclosure, an access of another method is also possible. For example, when the matrix of the views is constructed, values of the light field are allocated as respective weights to four elements specified by coordinates $(x_k, y_k)$, $(x_k+1, y_k)$, $(x_k, y_k+1)$, and, $(x_k+1, y_k+1)$ according to barycentric coordinates. In this case, among the elements of the weighted matrix W, elements corresponding to non-zero elements of the matrix T have a value of 1, and the remaining elements have a value of 0.

In operation S4, when components of the vectors a and b are identified, the processor or controller adjusts the intensity value 1 of the pixels of the display of the mobile electronic device 2 according to the components of the vector b and adjusts the transparency value t of the pixels of the spatial light modulator 3 according to the components of the vector a. Equations 4 and 5 described above mathematically represent a relationship among a, b, t, and l. Through these operations, a light field of a scene, which is approximately the same as observed by a user in the real, for example, as if a 3D effect is provided when the user views the scene, may be obtained.

According to an embodiment of the disclosure, the processor or controller may perform a pre-processing operation for each view of a previous scene before proceeding to operations S2 to S3. The pre-processing operation is an operation of enhancing details of views of a scene. In the pre-processing operation, a defined view (a detail to be enhanced) of a scene is segmented to overlapping units including groups of pixels of the display of the mobile electronic device 2. A following operation for each unit is performed.

First, a color of each pixel is converted into a YUV color model, wherein Y denotes a brightness component, and U and V denote color-difference components.

For each pixel, a separation operation for the brightness component Y is performed. Next, the brightness component Y is added to a bright channel Y for all pixels.

To obtain a Fourier spectrum, the bright channel is processed using Fourier transform. To smooth the spectrum at a boundary, a Gaussian window is used. The details are searched and enhanced using phase congruency analysis in the Fourier spectrum. In addition, to obtain a new bright channel Y', a Fourier inverse transform operation is performed.

The phase congruency analysis is now described. As known, values of a Fourier spectrum are complex numbers. The complex numbers are specified by an absolute value and an angle of deviation (that is, phase). In other words, the complex numbers may be expressed in a form of 2D vector having the same length and phase and the same direction as the absolute value. A search operation on a detail indicates an operation of separating vectors orienting one direction (together with specific divergence), and an enhancing operation on the detail indicates increasing a length of retrieved vectors, that is, an operation of increasing a magnitude of the absolute value.

After performing the operations described above, all processed units are combined such that overlapping is smoothly processed using a Gaussian window. Next, for each pixel, the new color model Y' and the initial components U and V are combined as a color model Y'UV. The color model Y'UV is converted into a color model RGB, and accordingly, a determined view of a scene may be acquired as the color model RGB.

Figure 9:
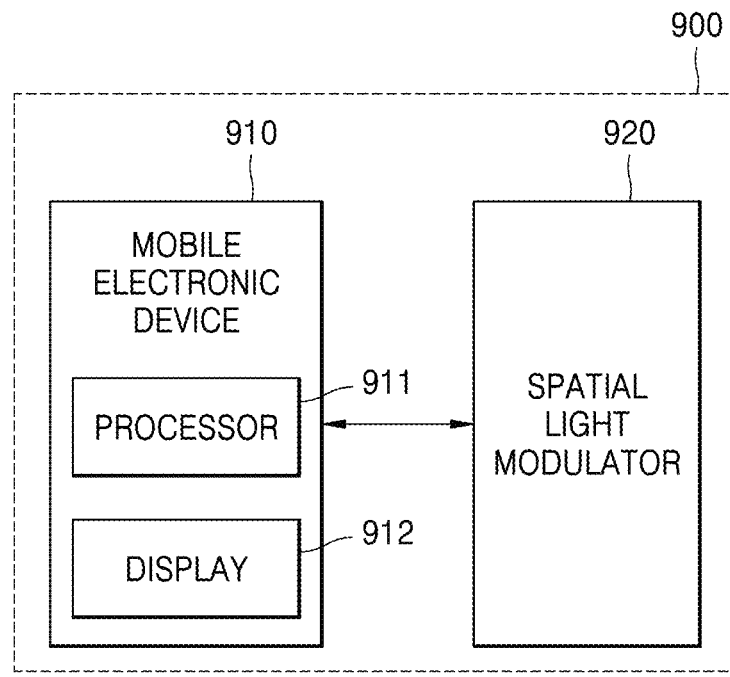
FIG. 9 is a block diagram of a display system according to an embodiment of the disclosure.

FIG. 9 is a block diagram of a display system according to an embodiment of the disclosure.

Referring to FIG. 9, a display system 900 may display a scene such that a light field which provides an experience approximate to a 3D effect in the real to a user is provided, when a real or virtual scene is displayed.

The display system 900 may include a mobile electronic device 910 and a spatial light modulator 920. According to an embodiment of the disclosure, the display system 900 may further include an optical lens (not shown). However, according to an embodiment of the disclosure, the optical lens is not necessary required as a separated component. The optical lens may be replaced by a medium having the same optical characteristics as the optical lens or included in the spatial light modulator 920.

The mobile electronic device 910 is a portable electronic device and may be implemented in various forms, such as a smartphone, a tablet computer, a personal digital assistant (PDA), and a portable multimedia player (PMP).

The mobile electronic device 910 may include a processor 911 and a display 912. Although FIG. 9 shows that the processor 911 is included in the mobile electronic device 910, this is not mandatory. According to an embodiment of the disclosure, the processor 911 may be located outside the mobile electronic device 910 and may control the mobile electronic device 910 and the spatial light modulator 920. For example, the processor 911 may be included in VR glasses or a VR helmet, which is a case in which the mobile electronic device 910 and the spatial light modulator 920 are accommodated.

The display 912 provides light to display a scene. According to an embodiment of the disclosure, the display 912 may include a liquid crystal display mounted in the mobile electronic device 910. For example, the display 912 may include a backlight of the mobile electronic device 910. In addition, the display 912 may include a liquid crystal of the mobile electronic device 910.

The processor 911 may control the mobile electronic device 910 and the spatial light modulator 920 to perform a display operation of the display system 900.

Although FIG. 9 shows that the spatial light modulator 920 is located outside the mobile electronic device 910, this is not mandatory. According to an embodiment of the disclosure, the spatial light modulator 920 may be included in the mobile electronic device 910 and modulate light provided from the display 912.

The processor 911 may receive a plurality of pieces of view information with respect to a scene to be displayed. According to an embodiment of the disclosure, the scene may be a virtual scene or a real scene. The plurality of pieces of view information are optical information of a scene, which has been acquired at a plurality of viewpoints. According to an embodiment of the disclosure, the plurality of pieces of view information may be a set of a plurality of pieces of view information acquired by photographing a real scene at a plurality of viewpoints. For example, the plurality of pieces of view information may be an intrinsic image acquired from a plurality of matched cameras having different viewpoints. According to an embodiment of the disclosure, the plurality of pieces of view information may be a set of a plurality of pieces of view information corresponding to a virtual scene formed using a rendering program. According to an embodiment of the disclosure, the processor 911 may form a plurality of pieces of view information corresponding to a virtual scene by itself.

The processor 911 may acquire adjustment information from the plurality of pieces of view information. The adjustment information may include information regarding transparency of the spatial light modulator 920 and light intensity of the display 912.

The light intensity of the display 912 indicates intensity of light emitted by each pixel of the display 912. The light intensity of the display 912 may be variably changed under control of the processor 911. The transparency of the spatial light modulator 920 indicates an optical influence of each pixel of the spatial light modulator 920 to light transmitting through the spatial light modulator 920 and may include color transparency.

According to an embodiment of the disclosure, the adjustment information may include a view matrix that is a matrix including each view information included in the plurality of pieces of view information, which is generated based on a geometric parameter. For example, the processor 911 may generate the view matrix from the plurality of pieces of view information. The view matrix is a matrix representing a light field of a corresponding scene to be displayed.

In addition, the processor 911 may perform light field factorization on the generated view matrix. As described with reference to FIG. 7, a light field indicating light passing through a certain pixel of the display 912 and a certain pixel of the spatial light modulator 920 may be represented by a function of intensity of the display 912 and transparency of the spatial light modulator 920. According to an embodiment of the disclosure, the processor 911 may factorize a given view matrix to a product of a matrix indicating intensity of the display 912 and a matrix indicating transparency of the spatial light modulator 920, and this is called light field factorization.

According to an embodiment of the disclosure, the light field factorization may be approximately achieved. Hereinafter, the light field factorization will be described below. In the embodiment below, it is described that the matrix indicating the intensity of the display 912 is a row vector and the matrix indicating the transparency of the spatial light modulator 920 is a column vector, but this is only illustrative, and the technical features of the disclosure are not limited thereto. The processor 911 may factorize a view matrix to a product of various types of matrices.

According to an embodiment of the disclosure, the processor 911 may perform the light field factorization by using a WRRI algorithm. The WRRI algorithm has a better processing speed and a less computation volume than a non-negative matrix factorization (NMF) algorithm, and thus processor 911 may perform real-time processing at a higher speed by using the WRRI algorithm than a speed using the NMF algorithm.

In more detail, as described with reference to Equation 9, the processor 911 may calculate optimized intensity of the display 912 and optimized transparency of the spatial light modulator 920 through an Hadamard product with respect to a given light field by using the WRRI algorithm. According to an embodiment of the disclosure, the processor 911 may form a row vector indicating intensity of the display 912, a column vector indicating transparency of the spatial light modulator 920, and an adjustment matrix indicating a product of the row vector and the column vector. The processor 911 may select a row vector and a column vector by using the WRRI algorithm such that an adjustment matrix is approximately the same as a view matrix.

The processor 911 may adjust an intensity value of light emitted from the display 912 and a transparency value of the spatial light modulator 920, based on the adjustment information.

According to an embodiment of the disclosure, the processor 911 may adjust intensity of the display 912 and transparency of the spatial light modulator 920 based on a light field factorization result of a view matrix. For example, the processor 911 may form a row vector and a column vector forming an adjustment matrix which is approximately the same as the view matrix and adjust the intensity of the display 912 and the transparency of the spatial light modulator 920 based on the row vector and the column vector. According to an embodiment of the disclosure, intensity of each pixel of the display 912 may be adjusted in response to an intensity control signal provided from the processor 911. In addition, transparency of each pixel of the spatial light modulator 920 may be adjusted in response to a transparency control signal provided from the processor 911.

The optical lens delivers, to the user, light which has passed through the display 912 and the spatial light modulator 920. The display system 900 provides a light field which provides an experience approximate to a 3D effect in the real to the user by providing light concentrated through the optical lens to the user.

Figure 10:
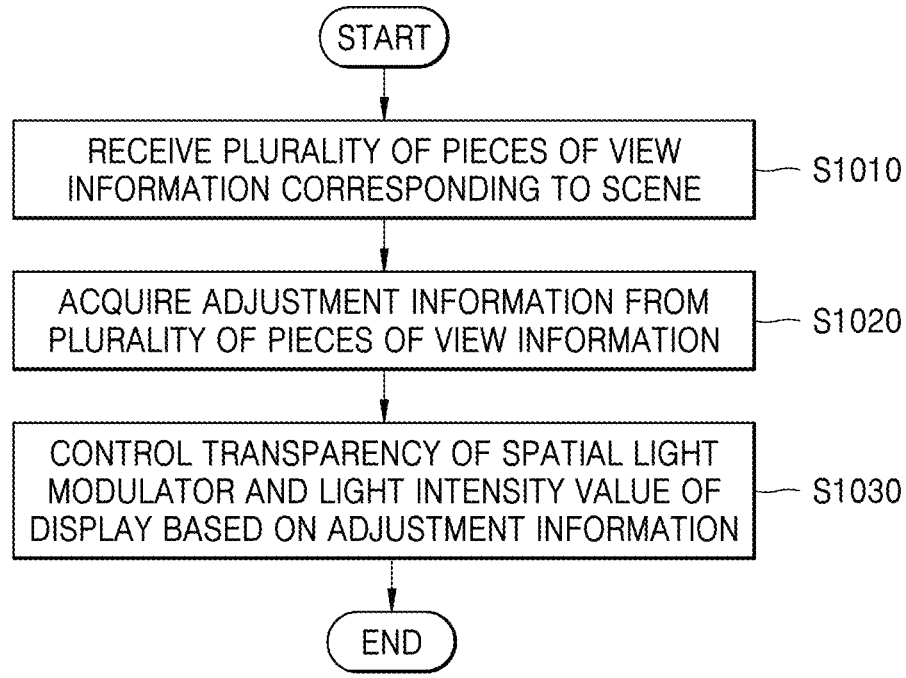
FIG. 10 is a flowchart of a method of displaying a scene according to an embodiment of the disclosure.

FIG. 10 is a flowchart of a method of displaying a scene according to an embodiment of the disclosure.

Referring to FIG. 10, in operation S1010, a processor receives a plurality of pieces of view information corresponding to a scene. According to an embodiment of the disclosure, the scene may be a real scene or a virtual scene. The plurality of pieces of view information may be acquired by photographing the scene at different viewpoints. For example, the plurality of pieces of view information may have a relationship of being captured by being sequentially shifted at a previously defined angle.

According to an embodiment of the disclosure, the plurality of pieces of view information may be a set of a plurality of pieces of view information acquired by photographing a real scene at a plurality of viewpoints. For example, the plurality of pieces of view information may be an intrinsic image acquired from a plurality of matched cameras having different viewpoints. According to an embodiment of the disclosure, the plurality of pieces of view information may be a set of a plurality of pieces of view information corresponding to a virtual scene formed using a rendering program. According to an embodiment of the disclosure, the processor may form a plurality of pieces of view information corresponding to a virtual scene by itself.

In operation S1020, the processor acquires adjustment information from the plurality of pieces of view information. The adjustment information may include information regarding transparency of a spatial light modulator and light intensity of a display. The light intensity of the display indicates intensity of light emitted by each pixel of the display. The transparency of the spatial light modulator indicates an optical influence of each pixel of the spatial light modulator to light transmitting through the spatial light modulator and may include color transparency. According to an embodiment of the disclosure, the adjustment information may include a view matrix.

In operation S1030, the processor may control the transparency of the spatial light modulator and a light intensity value of the display based on the adjustment information. According to an embodiment of the disclosure, intensity of each pixel of the display may be adjusted in response to an intensity control signal provided from the processor. In addition, transparency of each pixel of the spatial light modulator may be adjusted in response to a transparency control signal provided from the processor.

Light which has passed through the display and the spatial light modulator may be delivered to a user through an optical lens. The display method according to the disclosure may provide a light field which provides an experience approximate to a 3D effect in the real to a user by providing light concentrated through the optical lens to the user.

Figure 11:
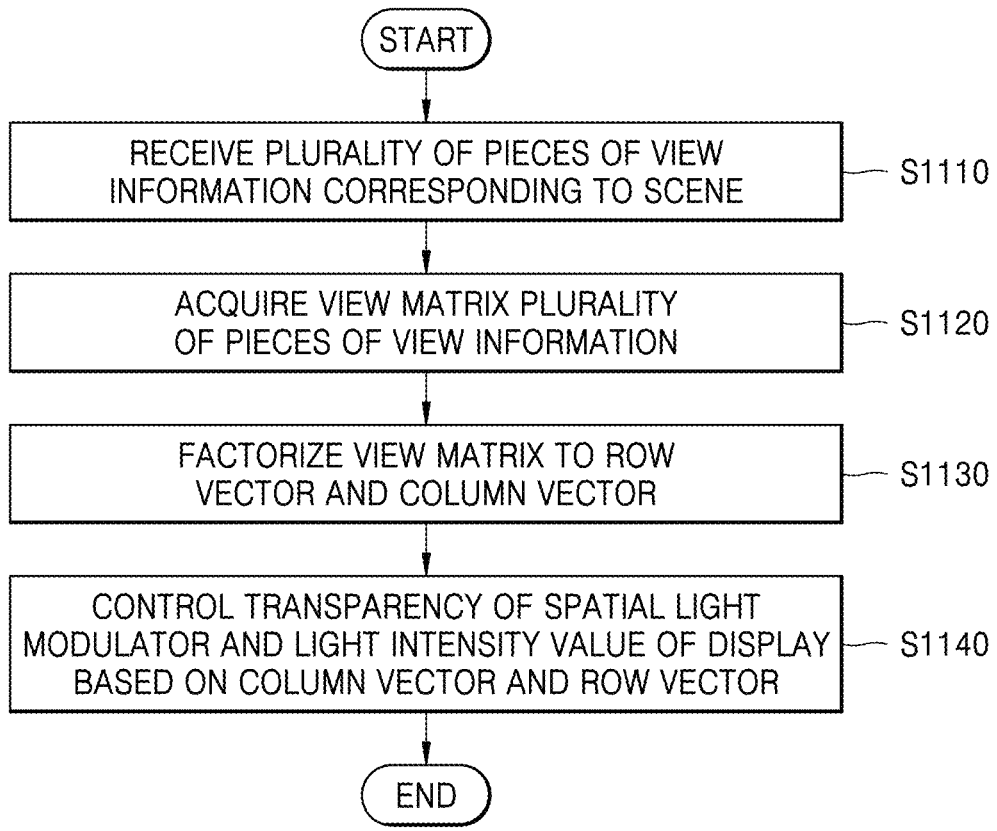
FIG. 11 is a flowchart of a method of displaying a scene according to an embodiment of the disclosure.

FIG. 11 is a flowchart of a method of displaying a scene according to an embodiment of the disclosure.

Referring to FIG. 11, in operation S1110, a processor receives a plurality of pieces of view information corresponding to a scene. According to an embodiment of the disclosure, the scene may be a real scene or a virtual scene. The plurality of pieces of view information may be acquired by photographing the scene at different viewpoints.

In operation S1120, the processor may acquire a view matrix included in adjustment information from the plurality of pieces of view information. For example, the processor may generate a view matrix that is a matrix including each view information included in the plurality of pieces of view information, based on a geometric parameter. The view matrix is a matrix representing a light field of a corresponding scene to be displayed.

In operation S1130, the processor may factorize the given view matrix to a product of a matrix indicating light intensity of a display included in a mobile electronic device and a matrix indicating transparency of a spatial light modulator.

According to an embodiment of the disclosure, the processor may perform the factorization by using a WRRI algorithm. In more detail, as described with reference to Equation 9, the processor may calculate optimized light intensity of the display and optimized transparency of the spatial light modulator through an Hadamard product with respect to a given light field by using the WRRI algorithm.

In operation S1140, the processor may control the transparency of the spatial light modulator and the light intensity of the display based on a result of the factorization. For example, the processor may factorize the view matrix to a row vector and a column vector, control the transparency of the spatial light modulator based on the column vector, and control the light intensity of the display based on the row vector. According to an embodiment of the disclosure, transparency of each pixel of the spatial light modulator may be adjusted in response to a transparency control signal provided from the processor, and intensity of each pixel of the display may be adjusted in response to an intensity control signal provided from the processor.

A display system may display a scene to a user based on the operations described above. According to an embodiment of the disclosure, light emitted from the display based on the adjusted light intensity is delivered to the user through an optical lens by passing through the spatial light modulator having the adjusted transparency. The display system may provide a light field which provides an experience approximate to a 3D effect in the real to the user by providing light concentrated through the optical lens to the user.

Figure 12:
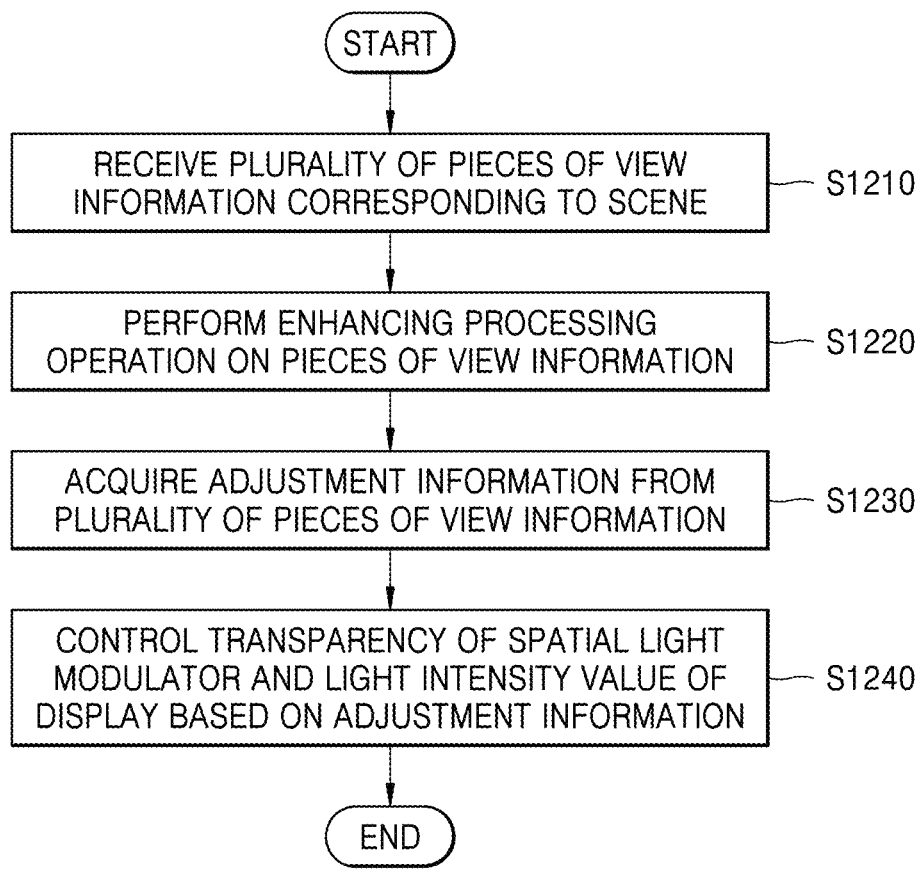
FIG. 12 is a flowchart of a method of displaying a scene according to an embodiment of the disclosure.

FIG. 12 is a flowchart of a method of displaying a scene according to an embodiment of the disclosure.

Referring to FIG. 12, a display system may perform an enhancing processing operation prior to acquiring adjustment information. The display system may provide a relatively clear and realistic experience to a user by using the enhancing processing operation to enhance a detail of a view matrix.

In operation S1210, a processor receives a plurality of pieces of view information corresponding to a scene. According to an embodiment of the disclosure, the scene may be a real scene or a virtual scene. The plurality of pieces of view information may be an intrinsic image acquired from a plurality of matched cameras having different viewpoints. Alternatively, the processor may form a plurality of pieces of view information corresponding to a virtual scene by itself by using a rendering program.

In operation S1220, the processor performs the enhancing processing operation on the pieces of view information. The enhancing processing operation is an operation of enhancing only a detail while maintaining color information of the pieces of view information as it is. According to an embodiment of the disclosure, for the enhancing processing operation, the processor may separate only a brightness channel from each view information and perform a processing operation on the brightness channel. According to an embodiment of the disclosure, the processor may use Fourier transform and phase congruency analysis for the enhancing processing operation.

In operation S1230, the processor may generate adjustment information. According to an embodiment of the disclosure, the processor may generate a view matrix that is a matrix including each view information included in the plurality of pieces of view information, based on a geometric parameter. The view matrix is a matrix representing a light field of a corresponding scene to be displayed.

According to an embodiment of the disclosure, the processor may factorize the enhancing-processed view matrix to a product of vectors. For example, the processor may factorize the enhancing-processed view matrix to a product of a matrix indicating light intensity of a display included in a mobile electronic device and a matrix indicating transparency of a spatial light modulator.

According to an embodiment of the disclosure, the processor may perform the factorization by using a WRRI algorithm. In more detail, as described with reference to Equation 9, the processor may calculate optimized intensity of the display and optimized transparency of the spatial light modulator through an Hadamard product with respect to a given light field by using the WRRI algorithm.

In operation S1240, the processor may control the transparency of the spatial light modulator and a light intensity value of the display based on the adjustment information. For example, the processor may factorize the view matrix to a column vector and a row vector, control the transparency of the spatial light modulator based on the column vector, and control the light intensity of the display based on the row vector. According to an embodiment of the disclosure, transparency of each pixel of the spatial light modulator may be adjusted in response to a transparency control signal provided from the processor, and intensity of each pixel of the display may be adjusted in response to an intensity control signal provided from the processor.

The display system may display a scene to the user based on the operations described above. According to an embodiment of the disclosure, light emitted from the display based on the adjusted light intensity is delivered to the user through an optical lens by passing through the spatial light modulator having the adjusted transparency. The display system may provide a light field which provides an experience approximate to a 3D effect in the real to the user by providing light concentrated through the optical lens to the user.

Figure 13:
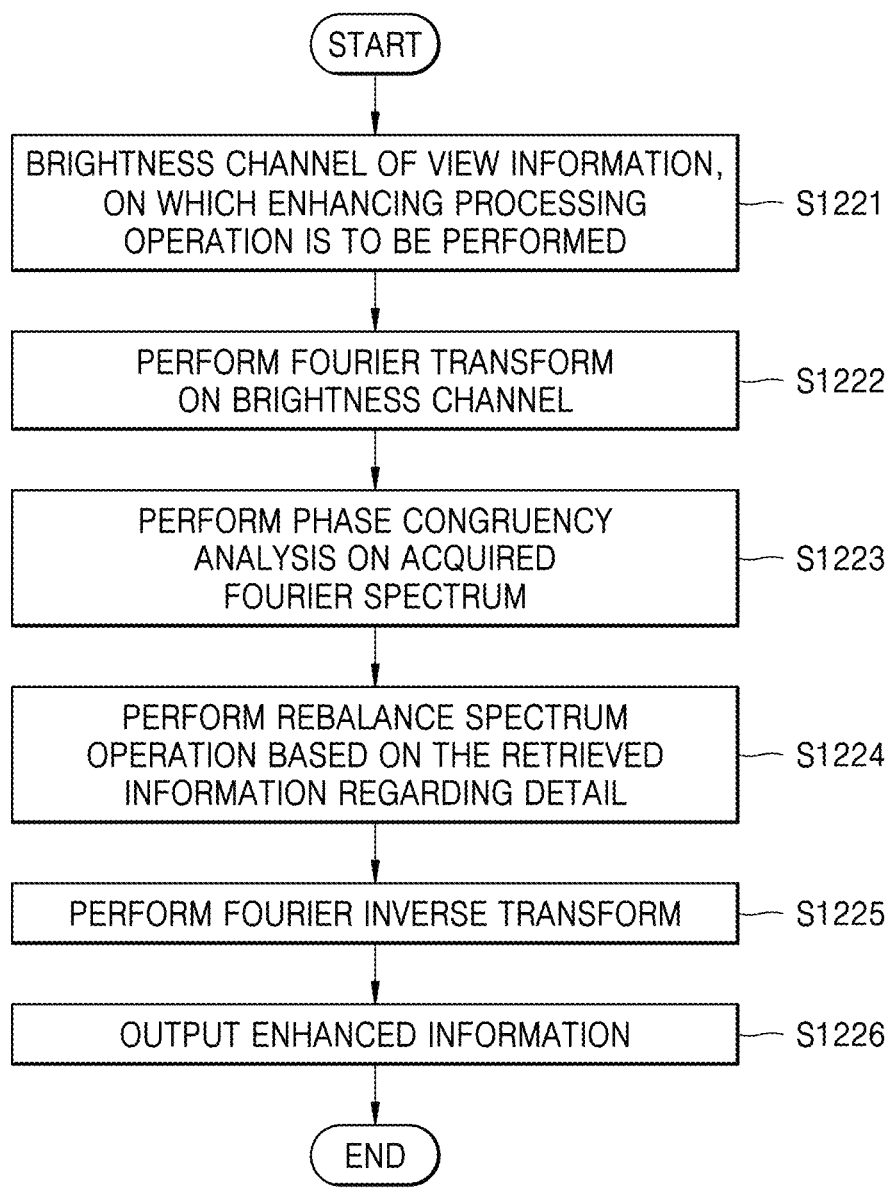
FIG. 13 is a flowchart of an enhancing processing operation according to an embodiment of the disclosure.

FIG. 13 is a flowchart for describing the enhancing processing operation in more detail according to an embodiment of the disclosure.

Referring to FIG. 13, in operation S1221, a processor extracts a brightness channel of view information, on which the enhancing processing operation is to be performed.

According to an embodiment of the disclosure, the processor may segment the view information into a plurality of units which overlap each other, to extract the brightness channel. Each unit may include a pre-defined plurality of pixels.

According to an embodiment of the disclosure, the processor may convert a color space model of the view information into a color space model having a brightness channel to extract the brightness channel. For example, the processor may convert the color space model of the view information into a YUV color space model or a YIQ color space model. The embodiment illustrates that the color space model of the view information is converted into the YUV color space model. However, the technical features of the disclosure are not limited to YUV color space information and may also be applied to other color spaces having a brightness channel.

In a YUV color space, a Y channel indicates information regarding brightness, and U and V channels indicate information regarding colors. For example, the U channel is a value obtained by subtracting a brightness component from a blue (B) channel of an RGB color space, and the V channel is a value obtained by subtracting the brightness component from a red (R) channel.

According to an embodiment of the disclosure, the processor may extract a Y component that is a brightness component of each unit of the view information. According to an embodiment of the disclosure, the processor may multiplex Y components of respective units to a Y channel that is a brightness channel of a view.

In operation S1222, the processor may perform Fourier transform on the brightness component or the brightness channel. The processor acquires a Fourier spectrum of the brightness component or the brightness channel through the Fourier transform. According to an embodiment of the disclosure, the processor may use a Gaussian window to smooth a boundary part of the spectrum.

In operation S1223, the processor performs a phase congruency analysis on the acquired Fourier spectrum. The processor searches the Fourier spectrum for information regarding a detail through the phase congruency analysis. According to an embodiment of the disclosure, the processor may search for the information regarding a detail through an operation of separating complex vectors orienting to a specific direction in the Fourier spectrum.

In operation S1224, the processor performs a rebalance spectrum operation based on the retrieved information regarding a detail. The rebalance spectrum operation is an operation of enhancing a retrieved detail. According to an embodiment of the disclosure, the processor may enhance the detail through an operation of increasing a magnitude of a length of retrieved complex vectors, that is, a magnitude of an absolute value.

In operation S1225, the processor performs Fourier inverse transform on the brightness component or the brightness channel on which the rebalance spectrum operation has been completed. The processor acquires an enhanced new brightness component or brightness channel Y' through the Fourier inverse transform.

In operation S1226, enhanced information is output. According to an embodiment of the disclosure, the processor may combine information regarding all units on which the processing has been performed, by using a Gaussian window such that overlapping is smoothly processed.

The processor combines the new brightness channel Y' and the initial color channels U and V to a color space model Y'UV. The color space model Y'UV is converted into a color space model RGB, and accordingly, enhanced view information of a scene may be acquired using the color space model RGB.

Figure 14:
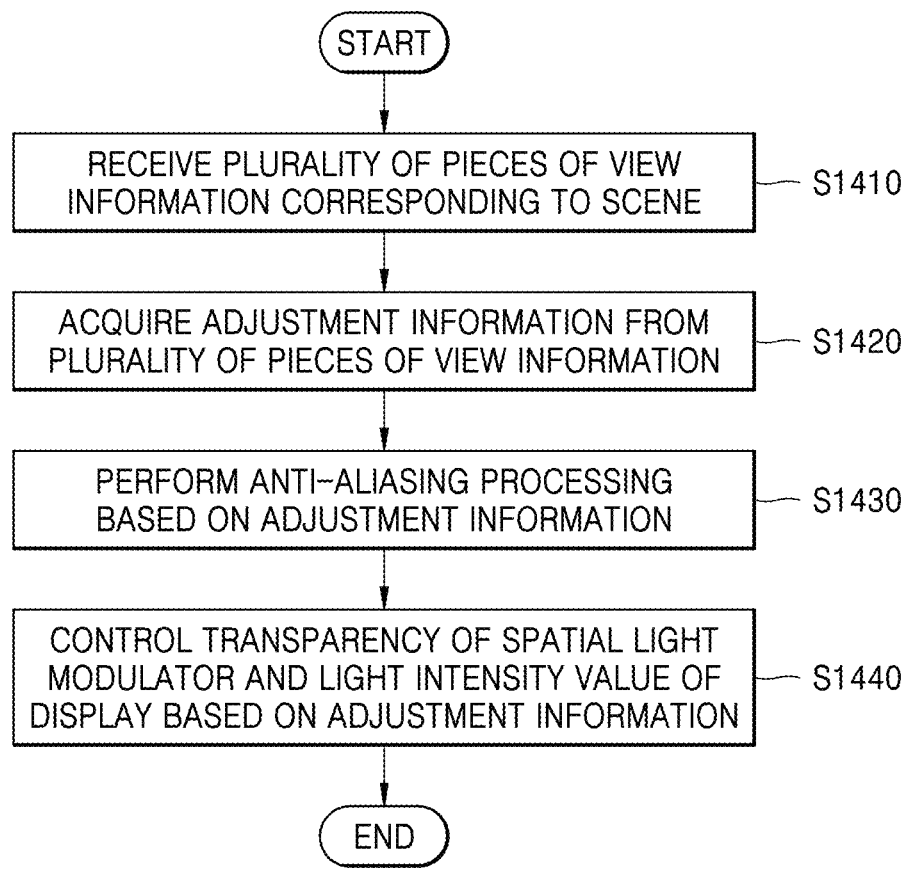
FIG. 14 is a flowchart of a method of displaying a scene according to an embodiment of the disclosure.

FIG. 14 is a flowchart of a method of displaying a scene according to another embodiment of the disclosure.

Referring to FIG. 14, a display system may perform anti-aliasing processing based on adjustment information. The display system may provide a relatively clear and realistic experience to a user by using an anti-aliasing processing operation to prevent a pixel staircase phenomenon and edge distortion.

In operation S1410, a processor receives a plurality of pieces of view information corresponding to a scene. According to an embodiment of the disclosure, the scene may be a real scene or a virtual scene. The plurality of pieces of view information may be an intrinsic image acquired from a plurality of matched cameras having different viewpoints. Alternatively, the processor may form a plurality of pieces of view information corresponding to a virtual scene by itself by using a rendering program.

In operation S1420, the processor may acquire adjustment information from the plurality of pieces of view information. According to an embodiment of the disclosure, the processor may generate a view matrix that is a matrix including each view information included in the plurality of pieces of view information, based on a geometric parameter. The view matrix is a matrix representing a light field of a corresponding scene to be displayed.

In operation S1430, the processor may perform the anti-aliasing processing operation based on the adjustment information.

According to an embodiment of the disclosure, the processor may factorize the view matrix included in the adjustment information to a product of a matrix indicating light intensity of a display included in a mobile electronic device and a matrix indicating transparency of a spatial light modulator.

According to an embodiment of the disclosure, the processor may perform the factorization by using a WRRI algorithm. In more detail, as described with reference to Equation 9, the processor may calculate optimized intensity of the display and optimized transparency of the spatial light modulator through an Hadamard product with respect to a given light field by using the WRRI algorithm.

The processor may perform the anti-aliasing processing operation on the view matrix. According to an embodiment of the disclosure, the processor may perform the anti-aliasing processing operation by using pixel barycentric coordinates. According to an embodiment of the disclosure, the processor may perform the anti-aliasing processing operation in an operation of performing light field factorization on the view matrix. For example, the processor may perform the anti-aliasing processing operation by calculating and using a weighted matrix in the operation of performing light field factorization.

In operation S1440, the processor may control transparency of a spatial light modulator and light intensity of a display based on the adjustment information. According to an embodiment of the disclosure, the processor may factorize the view matrix to a column vector and a row vector, control the transparency of the spatial light modulator based on the column vector, and control the light intensity of the display based on the row vector. According to an embodiment of the disclosure, transparency of each pixel of the spatial light modulator may be adjusted in response to a transparency control signal provided from the processor, and light intensity of each pixel of the display may be adjusted in response to an intensity control signal provided from the processor.

The display system may display a scene to the user based on the operations described above. According to an embodiment of the disclosure, light emitted from the display based on the adjusted light intensity is delivered to the user through an optical lens by passing through the spatial light modulator having the adjusted transparency. The display system may provide a light field which provides an experience approximate to a 3D effect in the real to the user by providing light concentrated through the optical lens to the user.

Figure 15:
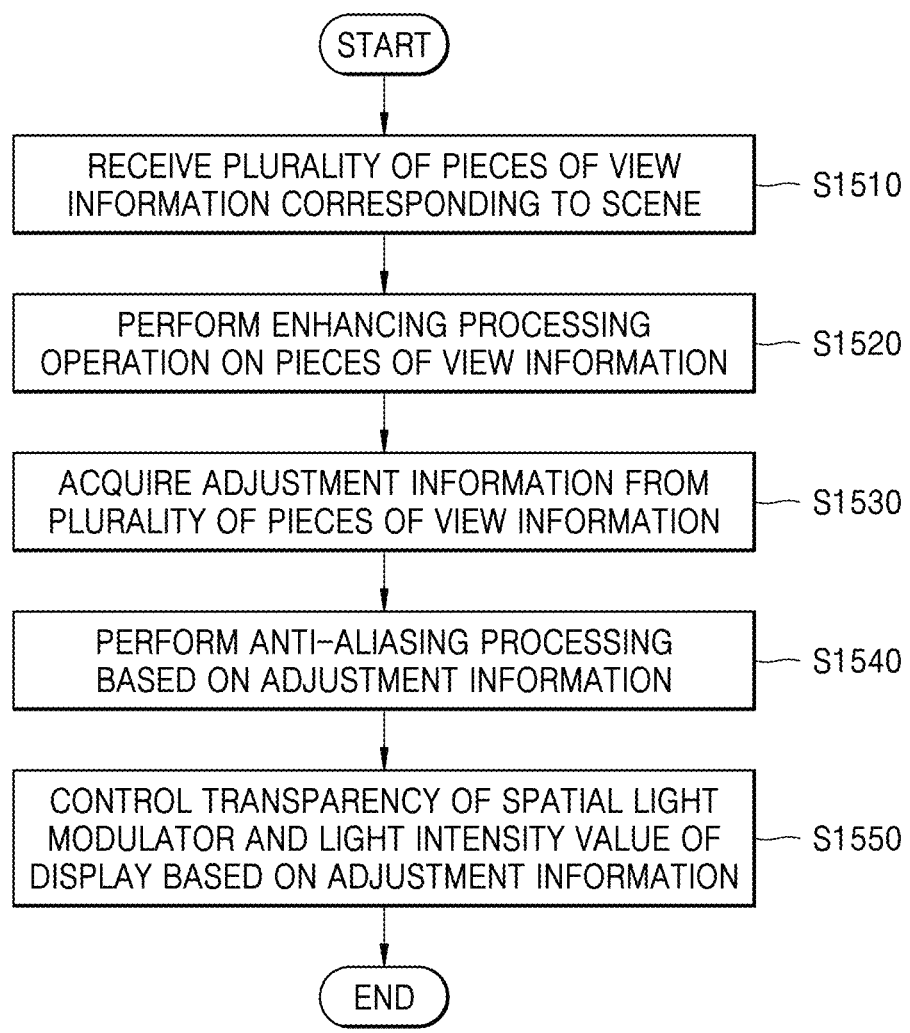
FIG. 15 is a flowchart of a method of displaying a scene according to an embodiment of the disclosure.

FIG. 15 is a flowchart of a method of displaying a scene according to an embodiment of the disclosure.

Referring to FIG. 15, a display system may perform an enhancing processing operation and an anti-aliasing processing operation on pieces of view information. The display system may provide a relatively clear and realistic experience to a user by using the enhancing processing operation and the anti-aliasing processing operation to enhance a detail of views and prevent a pixel staircase phenomenon and edge distortion.

In operation S1510, a processor receives a plurality of pieces of view information corresponding to a scene. According to an embodiment of the disclosure, the scene may be a real scene or a virtual scene.

In operation S1520, the processor performs the enhancing processing operation on the pieces of view information. The enhancing processing operation is an operation of enhancing only a detail while maintaining color information of the pieces of view information as it is. According to an embodiment of the disclosure, for the enhancing processing operation, the processor may separate only a brightness channel from each view information and perform a processing operation on the brightness channel. According to an embodiment of the disclosure, the processor may use Fourier transform and phase congruency analysis for the enhancing processing operation.

In operation S1530, the processor may acquire adjustment information from the plurality of pieces of view information. According to an embodiment of the disclosure, the processor may generate a view matrix that is a matrix including each view information included in the plurality of pieces of view information, based on a geometric parameter. The view matrix is a matrix representing a light field of a corresponding scene to be displayed.

In operation S1540, the processor may perform the anti-aliasing processing operation based on the adjustment information.

According to an embodiment of the disclosure, the processor may factorize the view matrix included in the adjustment information to a product of a matrix indicating light intensity of a display included in a mobile electronic device and a matrix indicating transparency of a spatial light modulator.

According to an embodiment of the disclosure, the processor may perform the factorization by using a WRRI algorithm. In more detail, as described with reference to Equation 9, the processor may calculate optimized intensity of the display and optimized transparency of the spatial light modulator through an Hadamard product with respect to a given light field by using the WRRI algorithm.

The processor may perform the anti-aliasing processing operation on the view matrix. According to an embodiment of the disclosure, the processor may perform the anti-aliasing processing operation by using pixel barycentric coordinates. According to an embodiment of the disclosure, the processor may perform the anti-aliasing processing operation in an operation of performing light field factorization on the view matrix. For example, the processor may perform the anti-aliasing processing operation by calculating and using a weighted matrix in the operation of performing light field factorization.

In operation S1550, the processor may control transparency of a spatial light modulator and light intensity of a display based on the adjustment information. According to an embodiment of the disclosure, the processor may factorize the view matrix to a column vector and a row vector, control the transparency of the spatial light modulator based on the column vector, and control the light intensity of the display based on the row vector. According to an embodiment of the disclosure, transparency of each pixel of the spatial light modulator may be adjusted in response to a transparency control signal provided from the processor, and light intensity of each pixel of the display may be adjusted in response to an intensity control signal provided from the processor.

The display system may display a scene to the user based on the operations described above. According to an embodiment of the disclosure, light emitted from the display based on the adjusted light intensity is delivered to the user through an optical lens by passing through the spatial light modulator having the adjusted transparency. The display system may provide a light field which provides an experience approximate to a 3D effect in the real to the user by providing light concentrated through the optical lens to the user.

The technical features of the disclosure could be clearly described with reference to the above-described embodiments and the accompanying drawings. It would be obvious to those of ordinary skill in the art that the technical features of the disclosure could also be modified and implemented by other embodiments without departing from the technical features of the disclosure. Therefore, the embodiments disclosed in the specification and the accompanying drawings should be understood in the illustrative sense only and not for the purpose of limitation. A component expressed in a singular form does not exclude the feature wherein the component exists plural in number unless they are defined differently.

The disclosed embodiments may be implemented in a form of a non-transitory computer-readable recording medium configured to store computer-executable instructions and data. The instructions may be stored in a form of program codes and may perform, when executed by a processor, a certain operation by generating a certain program module. In addition, the instructions may perform certain operations of the disclosed embodiments when executed by the processor.

Certain aspects of the disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the disclosure can be easily construed by programmers skilled in the art to which the disclosure pertains.

At this point it should be noted that the various embodiments of the disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the disclosure as described above. Alternatively, one or more processors operating in accordance with stored instructions may implement the functions associated with the various embodiments of the disclosure as described above. If such is the case, it is within the scope of the disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the disclosure can be easily construed by programmers skilled in the art to which the disclosure pertains.

It should be understood that embodiments described herein should be considered in a descriptive sense only and not for purposes of limitation. Descriptions of features or aspects within each embodiment should typically be considered as available for other similar features or aspects in other embodiments.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A system for displaying an image in units of a scene, the system comprising:
    a display configured to emit light;
    a spatial light modulator configured to modulate input light based on a transparency value; and
    at least one processor configured to:
    acquire adjustment information comprising transparency of the spatial light modulator and light intensity of the display from a plurality of pieces of view information corresponding to the scene, and adjust an intensity value of the light emitted from the display and the transparency value of the spatial light modulator based on the adjustment information, wherein the plurality of pieces of view information are optical information of the scene, the optical information having been acquired at a plurality of viewpoints, wherein the adjustment information comprises a view matrix factorized to a row vector and a column vector, and wherein the at least one processor is further configured to: control the intensity value of the light based on the row vector, and control the transparency value of the spatial light modulator based on the column vector.

2. The system of claim 1, wherein the at least one processor is further configured to factorize the view matrix to the row vector and the column vector by a weighted rank-1 residue iteration (WRRI) method.

3. The system of claim 2, wherein the at least one processor is further configured to:
    generate a weighted matrix based on barycentric coordinates of the view matrix and
    factorize the view matrix, on which anti-aliasing processing has been performed by using the weighted matrix, by the WRRI method.

4. The system of claim 1, wherein the at least one processor is further configured to form the view matrix based on a geometric parameter, and
    wherein the geometric parameter comprises a distance between the display and the spatial light modulator.

5. The system of claim 1, wherein the at least one processor is further configured to: perform an enhancing processing operation on the plurality of pieces of view information by extracting a brightness channel of the plurality of pieces of view information, and
    acquire the view matrix from the enhancing-processed plurality of pieces of view information.

6. The system of claim 5, wherein the at least one processor is further configured to:
    segment the plurality of pieces of view information into a plurality of units which overlap each other,
    extract first brightness components from the plurality of units,
    generate second brightness components by retrieving and enhancing detail vectors based on the first brightness components, and
    perform the enhancing processing operation by using the second brightness components.

7. The system of claim 6, wherein the at least one processor is further configured to retrieve the detail vectors by using phase congruency analysis.

8. The system of claim 7, wherein the at least one processor is further configured to enhance the detail vectors by using a rebalance spectrum operation.

9. The system of claim 1, further comprising:
    a mobile electronic device comprising the display and the at least one processor;
    and a mounting device configured to mount the mobile electronic device to a head of a user, wherein the mounting device is further configured to accommodate the mobile electronic device and the spatial light modulator therein.

10. The system of claim 9, wherein the mounting device comprises at least one of a virtual reality (VR) helmet or VR glasses.

11. The system of claim 9,
    wherein the plurality of pieces of view information are acquired using a plenoptic camera and stored in a memory of the mobile electronic device, and
    wherein the at least one processor is further configured to access the memory to extract the plurality of pieces of view information.

12. The system of claim 1, wherein the spatial light modulator comprises a liquid crystal layer and at least one polarizing plate.

13. The system of claim 1, wherein the at least one processor is further configured to acquire the plurality of pieces of view information by using a rendering program.

14. A scene display method of displaying an image in units of a scene, the method comprising:
    receiving a plurality of pieces of view information corresponding to the scene;
    acquiring, from the plurality of pieces of view information, adjustment information comprising intensity of light emitted from a display and transparency of a spatial light modulator configured to modulate the light;

adjusting an intensity value of the light emitted from the display and a transparency value of the spatial light modulator, based on the adjustment information;

controlling the intensity value of the light based on the row vector; and controlling the transparency value of the spatial light modulator based on the column vector, wherein the plurality of pieces of view information are optical information of the scene, the optical information having been acquired at a plurality of viewpoints, and wherein the adjustment information comprises a view matrix factorized to a row vector and a column vector.

15. The method of claim 14, wherein the acquiring of the adjustment information comprises acquiring a view matrix to be factorized to a row vector and a column vector, from the plurality of pieces of view information corresponding to the scene, and wherein the adjusting of the intensity value of the light emitted from the display and the transparency value of the spatial light modulator, based on the adjustment information, comprises controlling the intensity value of the light based on the row vector and controlling the transparency value of the spatial light modulator based on the column vector.

16. The method of claim 15, wherein the factorizing of the view matrix comprises factorizing the view matrix by a weighted rank-1 residue iteration (WRRI) method, and wherein the factorizing of the view matrix by the WRRI method comprises generating a weighted matrix based on barycentric coordinates of the view matrix and factorizing the view matrix, on which anti-aliasing processing has been performed by using the weighted matrix, by the WRRI method.

17. The method of claim 14, further comprising performing an enhancing processing operation on the plurality of pieces of view information by extracting a brightness channel of the plurality of pieces of view information, wherein the acquiring of the view matrix from the plurality of pieces of view information comprises acquiring the view matrix from the enhancing-processed plurality of pieces of view information.

18. The method of claim 17, wherein the performing of the enhancing processing operation comprises:

segmenting the plurality of pieces of view information into a plurality of units which overlap each other;

extracting first brightness components from the plurality of units;

generating second brightness components by retrieving and enhancing detail vectors based on the first brightness components; and performing the enhancing processing operation by using the second brightness components.

19. At least one non-transitory computer-readable computer program product having stored therein computer program codes, which when read and executed by at least one processor, perform a scene display method of displaying an image in units of a scene, the least one non-transitory computer-readable computer program product comprising a recording medium having stored therein a program configured to perform:

emitting light from a display;

modulating the light based on a transparency value;

acquiring, from a plurality of pieces of view information corresponding to the scene, adjustment information comprising transparency of a spatial light modulator and light intensity of the display; and adjusting an intensity value of the light emitted from the display and a transparency value of the spatial light modulator, based on the adjustment information, wherein the plurality of pieces of view information are optical information of the scene, the optical information having been acquired at a plurality of viewpoints, wherein the adjustment information comprises a view matrix factorized to a row vector and a column vector, and wherein the at least one processor is further configured to;

control the intensity value of the light based on the row vector, and control transparency value of the spatial light modulator based on the column vector.

* * * * *